United States Patent
Sakadjian

(10) Patent No.: US 7,409,711 B1
(45) Date of Patent: Aug. 5, 2008

(54) METHOD AND APPARATUS FOR TROUBLESHOOTING A SECURITY GATE SYSTEM REMOTELY

(75) Inventor: Hagop Sakadjian, Lake Forest, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 718 days.

(21) Appl. No.: 10/329,204

(22) Filed: Dec. 24, 2002

(51) Int. Cl.
*G06F 11/00* (2006.01)
*G06F 12/14* (2006.01)

(52) U.S. Cl. .................................. 726/22; 379/102.06
(58) Field of Classification Search .................. 726/22; 379/102.06
See application file for complete search history.

(56) References Cited

U.S. PATENT DOCUMENTS

| | | | | |
|---|---|---|---|---|
| 4,993,027 A * | 2/1991 | McGraw et al. | ............... | 714/29 |
| 5,073,968 A * | 12/1991 | Morrison | ..................... | 703/26 |
| 5,196,840 A * | 3/1993 | Leith et al. | ................. | 340/5.26 |
| 5,198,806 A * | 3/1993 | Lord | ............................ | 726/36 |
| 5,202,661 A * | 4/1993 | Everett et al. | ............... | 340/522 |
| 5,226,047 A * | 7/1993 | Catlin | ......................... | 714/28 |
| 5,490,134 A * | 2/1996 | Fernandes et al. | ........... | 370/466 |
| 5,499,378 A * | 3/1996 | McNeill et al. | ............... | 703/24 |
| 5,606,604 A * | 2/1997 | Rosenblatt et al. | ......... | 379/198 |
| 5,636,008 A * | 6/1997 | LoBiondo et al. | .............. | 399/8 |
| 5,684,721 A * | 11/1997 | Swoboda et al. | .............. | 703/23 |
| 5,721,880 A * | 2/1998 | McNeill et al. | ............... | 703/25 |
| 5,752,008 A * | 5/1998 | Bowling | ...................... | 703/13 |
| 5,764,639 A * | 6/1998 | Staples et al. | ............... | 370/401 |
| 5,788,669 A * | 8/1998 | Peterson | ...................... | 604/65 |
| 6,023,507 A * | 2/2000 | Wookey | ..................... | 709/224 |
| 6,052,524 A * | 4/2000 | Pauna | ........................... | 703/22 |
| 6,085,244 A * | 7/2000 | Wookey | ..................... | 709/224 |
| 6,205,547 B1 * | 3/2001 | Davis | ............................. | 713/1 |
| 6,218,956 B1 * | 4/2001 | Davis et al. | .................. | 340/5.2 |
| 6,249,868 B1 * | 6/2001 | Sherman et al. | ............. | 713/168 |
| 6,415,392 B1 * | 7/2002 | Suzuki et al. | ................. | 714/27 |
| 6,487,472 B1 * | 11/2002 | Song et al. | .................. | 700/121 |
| 6,550,027 B1 * | 4/2003 | Dobrosielski | ............... | 714/720 |
| 6,724,302 B2 * | 4/2004 | Parsadayan | ................. | 340/500 |
| 6,775,793 B2 * | 8/2004 | Deao et al. | .................... | 714/29 |
| 6,792,321 B2 * | 9/2004 | Sepe, Jr. | ....................... | 700/65 |
| 6,807,643 B2 * | 10/2004 | Eckardt et al. | ................ | 714/36 |
| 6,868,376 B2 * | 3/2005 | Swoboda | ...................... | 703/25 |
| 6,882,715 B2 * | 4/2005 | Hom | ...................... | 379/167.07 |
| 6,937,972 B1 * | 8/2005 | Van Ee | ........................ | 703/20 |
| 6,948,155 B2 * | 9/2005 | Agarwala et al. | ........... | 717/128 |
| 7,020,598 B1 * | 3/2006 | Jacobson | ..................... | 703/14 |
| 7,062,595 B2 * | 6/2006 | Lindsay et al. | .............. | 710/315 |
| 2001/0047213 A1 * | 11/2001 | Sepe, Jr. | ....................... | 700/65 |
| 2002/0007264 A1 * | 1/2002 | Swoboda | ..................... | 703/28 |
| 2002/0029259 A1 * | 3/2002 | Okada | ........................ | 709/219 |

(Continued)

*Primary Examiner*—Nasser Moazzami
*Assistant Examiner*—David García Cervetti
(74) *Attorney, Agent, or Firm*—Fitch, Even, Tabin & Flannery

(57) ABSTRACT

A system and method for troubleshooting the installation, operation and troubleshooting software on a remote security system computer is disclosed. The system by the installation of special software components on a remote and host computer allows a centrally located host computer to emulate the operation of a remotely located security computer that is operating special security system software, which software on the remote computer in turn controls the function of other remotely located security units running companion software and hardware.

3 Claims, 2 Drawing Sheets

U.S. PATENT DOCUMENTS

2002/0087949 A1* 7/2002 Golender et al. ............ 717/124
2002/0194415 A1* 12/2002 Lindsay et al. ............... 710/305
2003/0014693 A1* 1/2003 Goodman et al. ............. 714/31
2003/0033388 A1* 2/2003 Hom et al. ................... 709/220
2007/0142927 A1* 6/2007 Nelson ........................ 700/11

* cited by examiner

METHOD AND APPARATUS FOR TROUBLESHOOTING A SECURITY GATE SYSTEM REMOTELY

FIELD OF THE INVENTION

The present invention relates to security gate systems and more particularly to a method and apparatus to troubleshoot problems in the operation of a security gate system from a remote location.

BACKGROUND OF THE INVENTION

Security systems for controlling accesses to a restricted area are very common today. Apartment complexes, gated communities, individual residences, office complexes and research facilities often have these systems. At a minimum they consist of security gate at an entrance into the complex that requires someone arriving at the gate or barrier to either enter an access code into a gate controller system to open the gate or to call on a communication device located at the gate an individual in one of the units in the complex and have the individual authorize entry, typically by pressing the appropriate button of the key pad on the units communication device, usually the telephone.

Over the year these systems have become quite sophisticated and now quite often consist of systems controlled by computers. In larger systems this can include a primary computer located at a central control office that connects through local telephone lines or a separate private communication system to the gate controller units at several gated access entry locations around the restricted area. The local unit at each gated entry has its own computer controlled system. The local system at each gate will typically have saved in computer memory various access codes that occupants of the secure area can enter by keypad, transponder or otherwise to open the gate and gain access. The local units at each gate will typically have a communication unit that includes a display and directory of occupants so an individual arriving at the gate can contact a party in the restricted area and thereby gain entry. These systems typically have diagnostic systems that allow the central control office to monitor operation of the local units and diagnose operational problems at the local unit. An example of such a commercially available system is the Elite Icon™, Elite Pro™ and similar systems, which is a product of the assignee of this application.

Given the sophistication of current security systems, customers that purchase these systems are much more dependent for support on the vendors of these products. Since all but the most rudimentary systems use computers in their operation a sign percent of the problems encountered with the installation, operation and maintenance of these systems involves the computers and software that runs on these computers. This in fact has been a problem for a significant number of years. Often telephone assistance by the vendors service department is not sufficient to resolve these problems for a variety of reasons. The computers used by various customers will vary significantly in features and functions resulting in problems in installation and operation. Additionally, given the sophistication of the systems there is a need for the software to work seamlessly with various hardware components and the electromechanical gate systems as well as various vehicle detection systems and communications systems the possibility of problems in installation and use are only compounded. Often simply providing telephone assistance to a customer is not enough and a technician from the vendor's service staff has to make a trip to the customer's site. Often the problems consist of a failure to property install or configure the software. Additionally, given the sophistication of the software systems, if it had been property used and or understood the problems could not have occurred or are easily diagnosed. These more sophisticated systems have been in existence for a good number of years and no one has found a suitable solution to resolving software installation problems.

Thus, what is need is a system and method that will allow a vendor of security systems to quickly and easily troubleshoot problems with installation and operational problems of security system software and hardware. A system and method that is easy to implement and operate without the need for the vendor's service personnel to make a trip to the customer's facility every time there is a significant problem in the installation and/or operation of the security system.

SUMMARY

Thus, it is an objective of the present invention to provide a system and method that will allow for the remote trouble shooting of security system software without the need for a trained technician to be present at the user's site. It is a further object of the present invention to provide a system and method that can be quickly and easily integrated into existing systems.

The present invention accomplishes these and other objectives by providing A system for trouble shooting problems in a security gate computer system having: 1) a host computer system with a remote master computer emulation system; 2) a remote computer system with a remote slave computer emulation system; 3) a communication link between the host and remote computer; and 4) whereby when an operative link is established between the host computer and the remote computer the host computer can emulate the operation of the remote computer in real time when the remote master and remote slave computer emulation units are operating in concert.

In another aspect of the invention it provides A method for trouble shooting problems in a security gate computer system including the steps of: establishing an communication link between a host service security system computer system and a remote operational security gate computer system; emulating the operation of the remote computer on the host computer; and having the host computer perform fundamental operations on the remote computer in real time to thereby assure the proper functioning of security gate system software on the remote computer.

BRIEF DESCRIPTION OF THE DRAWINGS

The invention will be better understood by an examination of the following description, together with the accompanying drawings, in which.

DETAILED DESCRIPTION OF THE PREFERRED EMBODIMENT

Figure 1:
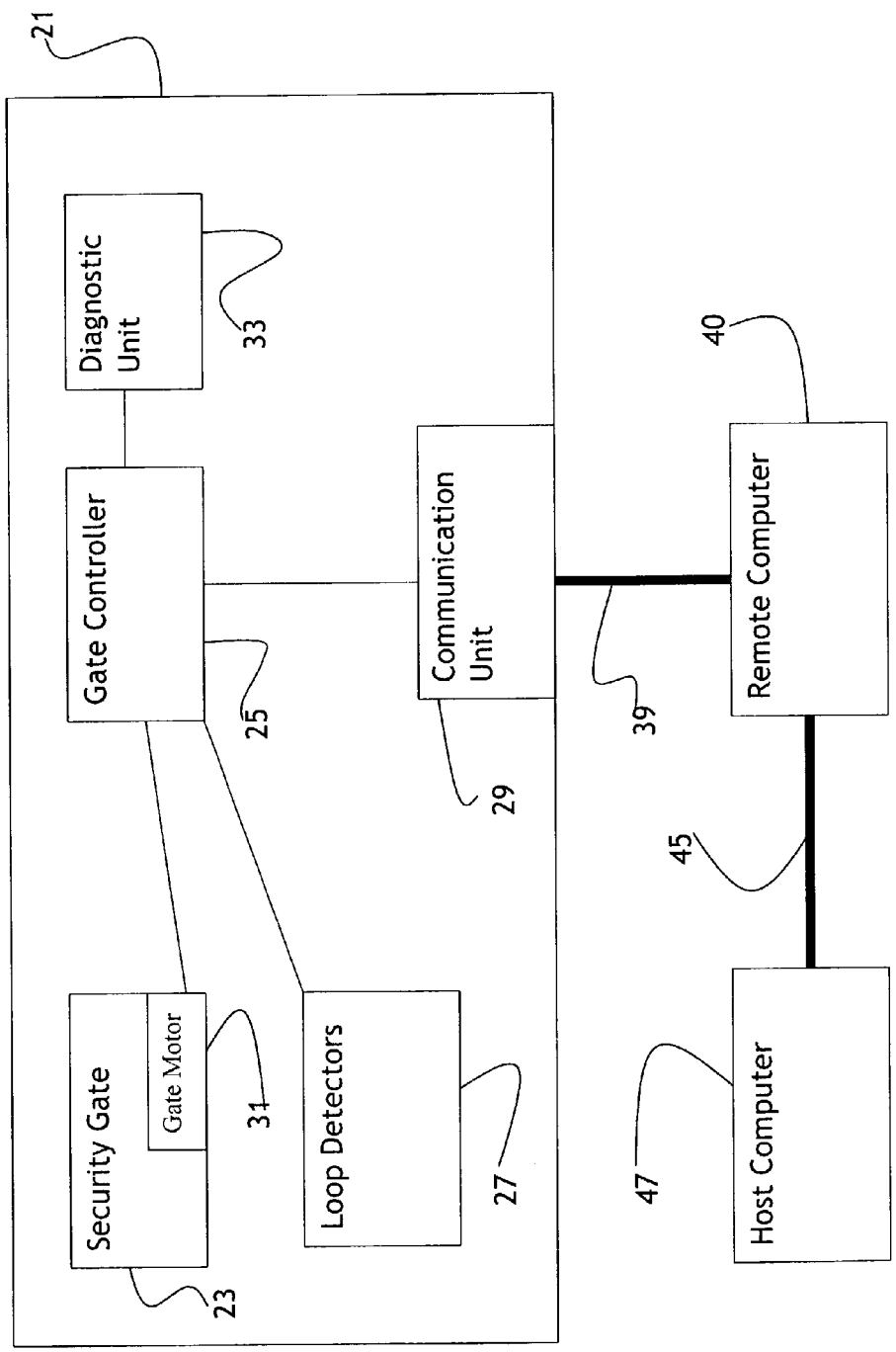
FIG. 1 is a block diagram of the overall system in which a preferred embodiment of the present invention will function.

FIG. 1 provides a block type schematic type of diagram of one type of security gate system with which the invention would function. The basic security system 21 has a security gate controlled by a gate controller 25. Gate controller 25 can detect the presence of a vehicle, not shown, at security gate system 21 with loop detectors 27 embedded in the roadway surrounding the gate 23. The controller, which has its own internal computer system with memory and operational software, not shown, upon detecting a vehicle at the gate generates through its communication unit an activation signal to activate a transponder, not shown in the vehicle present at the gate. This assumes that the vehicle at the gate is that of a resident or other person with authority to enter the restricted access area. Upon receiving the coded signal from the transponder in the vehicle if the gate controller determines by checking a look up table in its memory that the code is one authorized for access it opens gate 23 by activating gate motor 31.

Security gate system 21 also has diagnostic unit 33 which wilt aglow either technician or site o, one at a remote computer 40 to run various diagnostic routines to evaluate the condition of the security gate system and troubleshoot operational problems that may be affecting the unit. Communication unit 29 has a variety of capabilities including radio transmission to and from transponders and other wireless units. Additionally, by a modem connection it can communicate over a private or regular telephone line 39 with a remote computer 40. The remote computer typically would be one located in a central security office and in fact connected to multiple security gate units and monitor the operation of each of the security gate systems. Such systems would run Elite Icon™, Elite Pro™ or similar software that would allow for monitoring and control of the operation of the remote security gate units. Such software based security systems are known in the art and have a wide variety of functions a capabilities only a few of which have been high lighted here to provide a basic background knowledge.

In turn Remote Computer 40 can connect by modem and telephone line 45 to a host computer 47. The host computer could be that of the original vendor of the security gate system and associated software. This connection will facilitate providing service and troubleshooting services to the customer using the systems.

Figure 2:
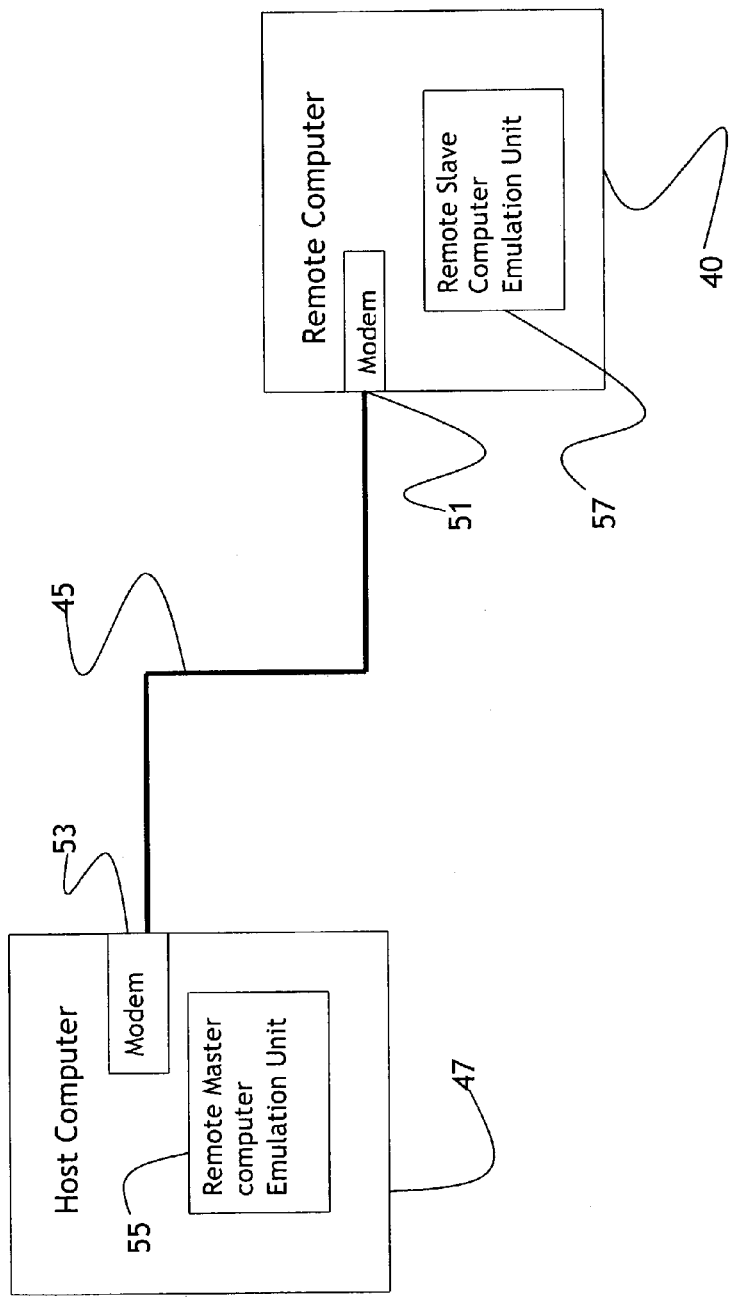
FIG. 2. is a block diagram another aspect of the system of the present invention.

FIG. 2 provides a block type of diagram of the fundamental features of the invention. As noted, Remote Computer 40 connects by modem 51 over telephone line 45 to modem 53 of Host Computer 47. Host Computer 47 will have a remote master computer emulation unit 55 and Remote Computer 40 will have a remote slave computer emulation unit 57. Emulation unit 55 and 57 allows an operator sitting at Host Computer 47 to simulate the operation of Remote Computer 40 in real time. Thus, if the operator of Remote Computer 40 experiences problems in installation or operation of the security system software on Remote Computer 40 a connection can be established between Remote Computer 40 and Host Computer 47 and the technician at Host Computer 47 can emulate the operation or Remote Computer 40 in real time as if he or she were sitting at the terminal of Remote Computer 40.

The invention in its preferred embodiment would be implemented as an embedded software system with the appropriate software on the remote computer 40 and on Host computer 47. The system would function such that the host computer would basically run the remote computer down to the operating system level. The operator at the host computer would be able to modify any system parameters on the remote computer and run any applications as well as access and control any peripheral devices or systems connected to the remote computer.

These systems would include security features to prevent unauthorized individuals from hacking into the system, which are typically security access codes.

Although special software programs could be written to implement the system and method of the present invention there are a number of commercially available software systems available that could be incorporated into the present invention and provide the necessary functionality. Among them are Semantec pcAnywhere™ and Timbuktu™. These software programs would be part of the standard installation of the system of the present invention that can be installed with the present invention.

While the invention has been particularly shown and described with reference to a preferred embodiment thereof, it with be understood by those skilled in the art that various changes in form and detail may be made to it without departing from the spirit and scope of the invention.

I claim:

1. A method for trouble shooting problems in a security gate computer system comprising the steps of:
    performing security gate system software on a remote computer, remote from a security gate system, to evaluate the condition of the security gate system;
    establishing a communication link between a host computer and the remote computer;
    emulating the operation of the remote computer in real time on the host computer; and
    diagnosing problems with the operation of security gate system software on the remote computer by the emulation operation on the host computer, in real time via the communication link; and
    correcting the problems that have been diagnosed on the host computer and communicating such corrections to the remote computer via the communication link to assure the proper functioning of security gate system software on said remote computer.

2. A system for trouble shooting problems in a security gate computer system comprising:
    a security gate system configured to control the operation of a security gate;
    a host computer system with a remote master computer emulation system;
    a remote computer system configured to run security gate system software to evaluate the security gate system, the remote computer system comprising a remote slave computer emulation system;
    a communication link between the host computer system and the remote computer system; and
    the remote master and remote slave computer emulation systems comprise software configured to implement emulation by said host computer system of the operation of the remote computer system in real time and to diagnose and to correct problems with the operation of the remote computer system at the host computer and then communicate such corrections to the remote computer in real time via the communication link.

3. The system of claim 2 wherein said master remote computer and said slave remote computer emulation systems are software programs running on said host and said remote computer.

* * * * *